United States Patent Office 2,784,829
Patented Mar. 12, 1957

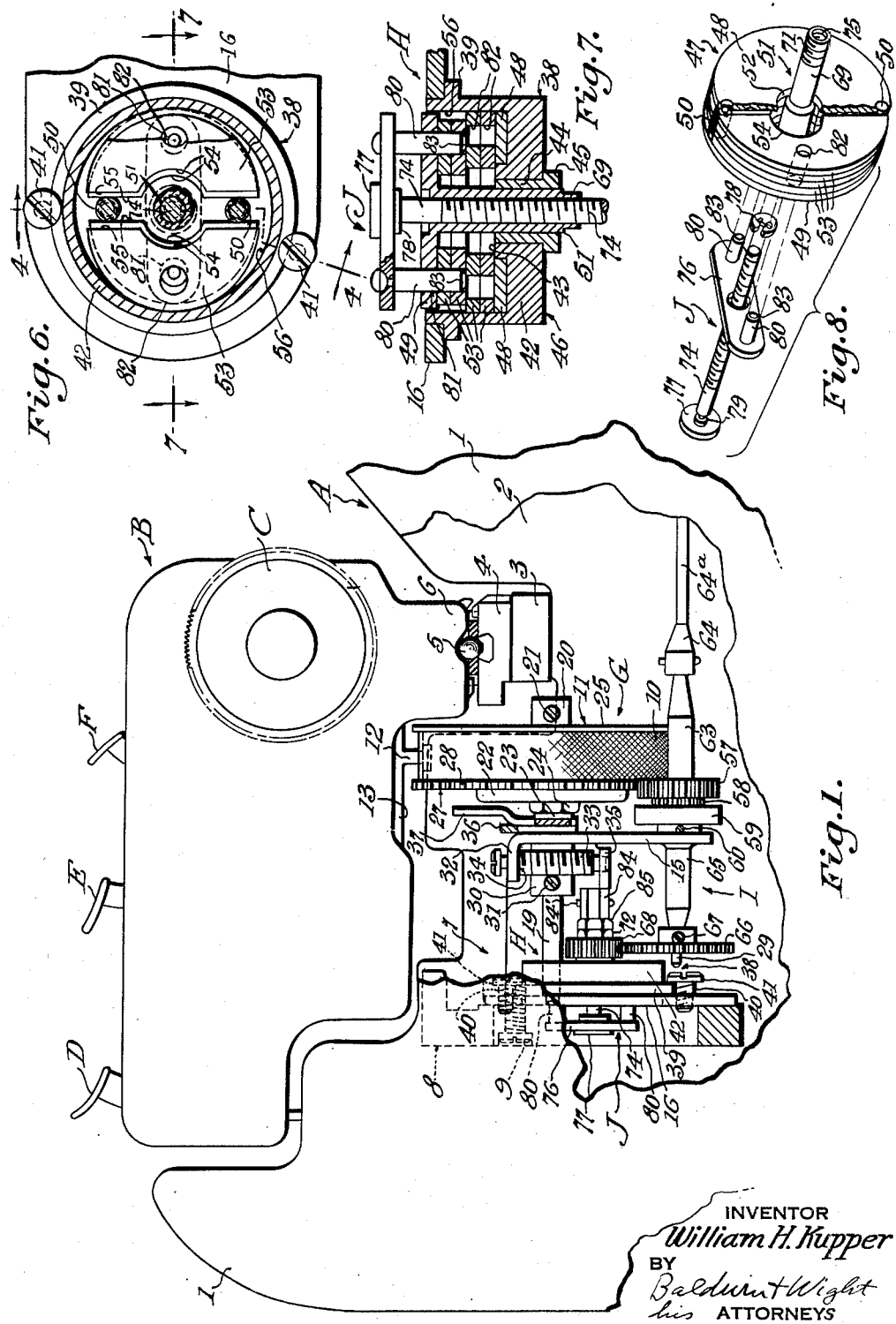

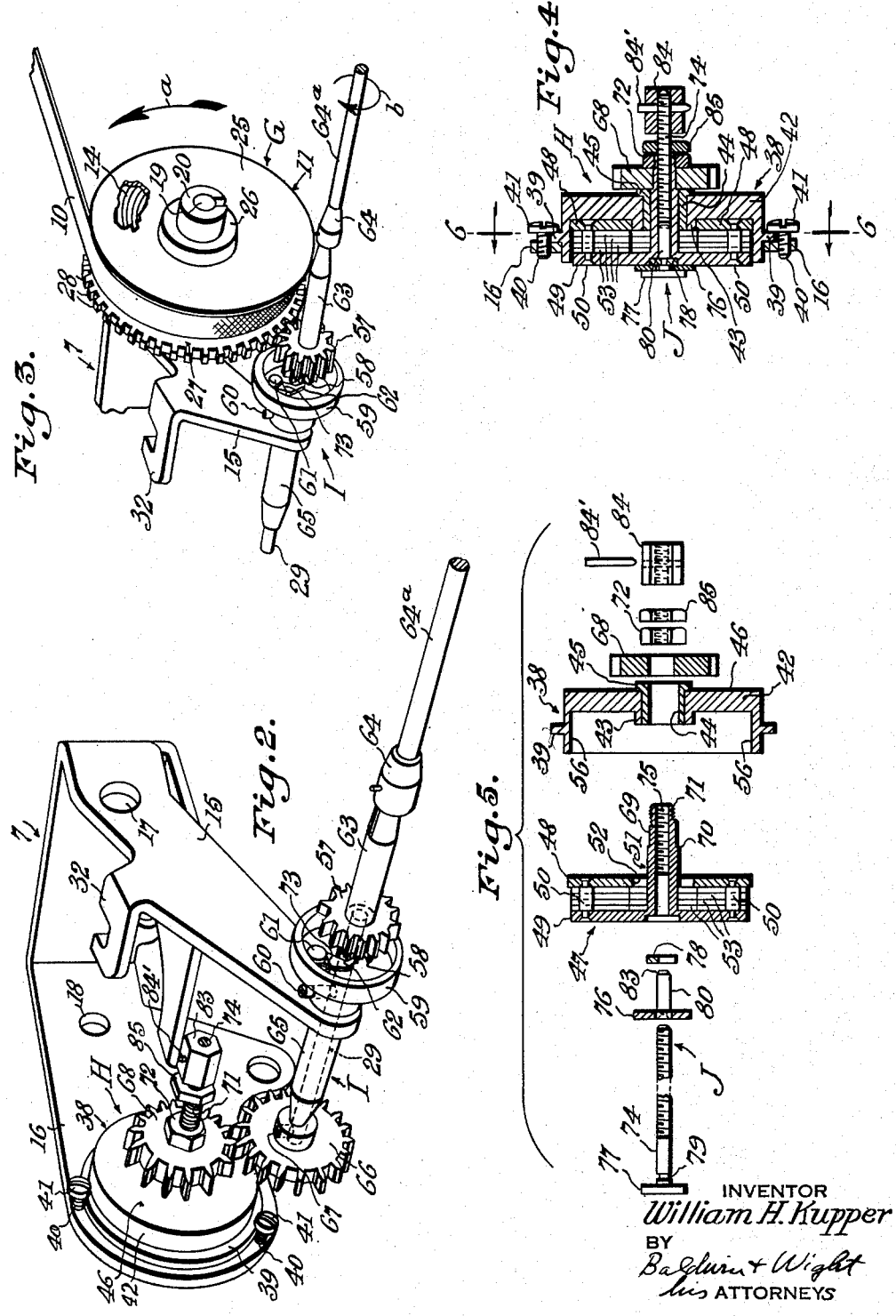

2,784,829

TYPEWRITER OR LIKE MACHINE CARRIAGE BRAKE MECHANISM

William H. Kupper, West Hartford, Conn., assignor to Royal McBee Corporation, a corporation of New York Application June 10, 1954, Serial No. 435,868

18 Claims. (Cl. 197—64)

This invention relates to typewriting or like machines and more particularly to centrifugal tabulator brake mechanism for controlling the speed of a typewriter or like machine carriage during a tabulating run.

Many machines of the class referred to, e. g., typewriters, are equipped with a carriage and carriage driving means including a spring barrel connected to the carriage by gearing or, more commonly, by a draw band wound around the barrel and connected to the carriage and adapted to drive the carriage in letter spacing and tabulating direction. It is common practice to provide means for adjusting the loading of the barrel spring to compensate for changes in the spring characteristics due to age, or to condition the machine for most convenient and agreeable use according to preferences of individual operators and according to the type of tabulating operation expected to be performed most frequently with the machine. Adjustment of the loading of the spring barrel results in a greater or lesser force tending to drive the carriage in letter spacing and tabulating direction, and it frequently is desirable to adjust or control the speed at which the carriage can travel during tabulating runs.

In accordance with the present invention, new and improved mechanism is provided for regulating or controlling the speed at which the carriage may travel during its tabulating run and which may be adjusted independently of the adjustment of the spring motor.

An object of the invention is to provide improved mechanism for controlling the speed at which a typewriter or like machine carriage may travel during a tabulating run.

Another object of the invention is to provide mechanism for controlling the speed of a typewriter or like machine carriage during a tabulating run which is adjustable so as to condition the machine for preferred use.

Another object of the invention is to provide adjustable mechanism for controlling the speed of a typewriter or like machine carriage during a tabulating run which is operable by centrifugal force and which is activated in response to tabulating travel of the carriage.

Another object of the invention is to provide a centrifugal force operated mechanism for controlling the speed of a typewriter or like machine carriage and which includes selectively operable and inoperable parts conditionable to vary the carriage speed controlling effort exerted.

These and other objects and advantages of the invention will be pointed out specifically or will become apparent from the following description, the appended claims, and the accompanying drawings in which:

Figure 1 is an elevational view fore and aft of a typewriter embodying the invention, showing a carriage and a portion only of a machine frame, some of the frame parts being cut away and other parts being shown in section;

Figure 2 is a perspective view of some of the parts shown in Figure 1, the view being taken from inside the machine looking rearwardly toward the right;

Figure 3 is a perspective view taken from the same point as Figure 2, and showing the association of the carriage driving means and the carriage speed control means;

Figure 4 is a vertical sectional view of the centrifugal force operated carriage speed controlling mechanism, taken on the irregular line 4—4 of Figure 6, the mechanism being shown in inoperative or disabled condition;

Figure 5 is an exploded vertical sectional view of the mechanism shown in Figure 4;

Figure 6 is a vertical sectional view of the mechanism shown in Figures 4 and 5, taken on the line 6—6 of Figure 4, and illustrating the mechanism in one of its operative conditions;

Figure 7 is a sectional view taken on the line 7—7 of Figure 6; and

Figure 8 is a perspective view of parts of the carriage speed controlling mechanism, some parts being shown in separated relation to illustrate assembly sequences.

Mechanism constructed in accordance with the invention is disclosed as being embodied in a typewriter having a main frame A equipped with left- and right-hand cover plates 1 and 2, respectively, the frame including a supporting bracket 3 for a lower track rail 4 carrying anti-friction balls 5 which support a top rail 6 forming part of a carriage B, the rails 4 and 6 and the balls 5 serving to mount the carriage B for tabulating and return movements on the frame A. The carriage may be equipped with the usual manually operable work sheet supporting and positioning means including a knurled hand wheel C for manually operating a rotary work sheet feeding member or platen (not shown), a margin setting finger lever D, a work sheet feed roll releasing lever E, and a carriage release lever F.

Mechanism is provided for driving the carriage B in letter spacing and tabulating direction, and in the form shown, includes a spring motor generally designated G mounted on a bracket 7 secured to a main frame mounting bracket 8 by screws, one of which is shown at 9. The spring motor G is arranged to apply constant pulling force to a draw band 10 connected at one end to the spring motor drum 11 and at its other end to a depending hook 12 on the under side of the carriage right-hand end plate 13. The spring motor G is mounted, in the disclosed embodiment of the invention, at the left-hand side of the machine and includes a barrel spring 14 (see Figure 3) mounted within the drum 11 and adapted to rotate the drum 11 in the direction of the arrow $a$ so as to urge the carriage B to move to the left, i. e., in letter spacing direction under the control of suitable feeding mechanism, e. g., an escapement mechanism (not shown). Suitable mechanism (not shown) is provided for disabling the escapement mechanism to permit the carriage B to make a tabulating run under the driving force of the spring motor G.

The bracket 7 which carries the motor G is formed with a front plate 15 and a rear plate 16 which are apertured as at 17 and 18, respectively, to provide aligned bearings for a shaft 19 extending fore and aft of the machine and being rockably adjustable in the plate bearings. A spring anchor 20 is secured to the shaft 19 by a set screw 21, and is positioned on the shaft so as to be disposed within and at the center of the drum or barrel 11. The rear face of the drum 11 is provided with a hub-like part 22 within which are located anti-friction balls (not shown) and races (not shown) so positoned as to mount the motor G coaxially and rotatably with respect to the shaft 19. The spring anchor 20 includes a sleeve 23 on which is threaded a nut 24 which maintains the anti-friction balls and races securely in position. The front disc-like wall 25 of the barrel 11 is centrally apertured for reception of a bushing 26 which is free to rotate on the spring anchor 20. The rear disc-like wall 27 of the barrel 11 is provided with gear teeth 28, the barrel 11 thus constituting a driving gear for driving a ribbon spool driving shaft 29 and for other purposes to be described hereinafter.

The inner end of the coiled spring 14 is secured to the spring anchor 20, and the outer end of the spring 14 is secured to the barrel 11 in a known manner, as for example, in the manner disclosed in the patent to Ryan, No. 2,678,122. When the mechanism is prepared for operation, the spring 14 is tensioned or loaded and, since its inner end is held stationary by the spring anchor 20, the barrel 11 is caused to rotate in the direction of the arrow a in Figure 3 for driving the carriage B in the letter spacing and tabulating direction as previously explained. When the carriage is moved in the opposite or return direction, the barrel 11 is rotated in the reverse direction, against the urge of the spring 14.

Mechanism is provided for adjusting the position of the anchor 20 angularly about the axis of the shaft 19 so as to vary the loading of the spring 14 and hence to vary the force with which the carriage B is urged in the tabulating direction. In the form shown, a worm toothed sleeve 30 is mounted fast on the shaft 19 by means of set screws, one of which is shown at 31. The front plate 15 has a rearwardly bent ear 32 through which extends a shouldered worm adjusting screw 33, the shoulder 34 of the screw 33 seating against the bottom surface of the ear 32 and the thread of the screw meshing with the teeth (not shown) of the worm sleeve 30. The end of the screw 33 is guided by an apertured ear 35 projecting rearwardly from the front plate 15. The spring 14 reacts on the shaft 19 so as to tend to rotate the shaft and the worm toothed sleeve 30 in a direction opposite to the arrow a in Figure 3, in consequence of which the worm sleeve 30 tends to force or thrust the screw 33 upwardly as viewed in Figure 1. This thrust is resisted by the engagement of the shoulder 34 on the screw 33 with the bottom surface of the ear 32. To adjust the loading of the spring 14 and hence the force with which the carriage B is urged in the tabulating direction, a screw driver may be utilized to turn the worm adjusting screw 33 which causes rotation of the worm toothed sleeve 30, the shaft 19, and the spring anchor 20 to increase or decrease the loading of the spring 14, depending upon in which direction the screw 33 is turned.

Those parts located adjacent the rear disc-like wall 27 of the drum 11 and indicated by reference characters 36 and 37 constitute a portion of the back spacing mechanism customarily provided in machines of the class referred to and do not form any part of the present invention.

Centrifugal tabulator brake mechanism generally designated H is provided for controlling the speed of the carriage B during a tabulating run, the carriage B being driven in its tabulating direction by the spring motor G as previously described. In the illustrated embodiment of the invention, the centrifugal tabulator brake mechanism includes a cylindrical housing or brake drum generally designated 38 having a peripheral flange 39 disposed intermediate the ends of the element 38. The bracket 7 has its rear plate 16 apertured so as to receive the housing snugly, the flange 39 abutting the rear plate 16 and thus preventing passage of the housing 38 through the rear plate. The brake drum 38 is fixed relatively to the bracket 7 by a number of screws 40, the heads 41 of which overlap the flange 39 and retain it in abutting relation against the rear plate 16 when the screws are threaded into screw holes formed in the rear plate. The rear end of the housing 38 is open while the front end is formed with a wall 42 which is centrally apertured and flanged as at 43 for reception of a bearing 44 which projects forwardly of the wall 42 and has a flange 45 abutting the front face 46 of the wall 42.

Mounted to rotate within the fixed housing 38 is a cage assembly generally designated 47. The cage assembly 47 includes a retainer plate 48 and an end plate 49 which is mounted on and spaced from the plate 48 by shouldered pins 50 which are staked both to the retainer plate 48 and the end plate 49, thereby connecting both plates for conjoint rotation. The end plate 49 is formed with an integral, centrally disposed, forwardly projecting hub or sleeve 51 which extends beyond the brake drum 38 and which is journalled in the wall 46 by the bearing 44. The retainer plate 48 is provided with a centrally disposed opening 52 through which the hub 51 projects.

Mounted within the cage between the plates 48 and 49 is a plurality of substantially semi-circular brake shoe segments 53, arranged in co-planar pairs, the plates 48, 49 and the pins 50 maintaining the brake shoes in assembled relation. The segments 53 are formed on radii substantially less than the radius of the cylindrical brake drum 38, and the radially innermost part of each segment 53 is removed as at 54 so as to avoid interference between the segments 53 and the hub 51 when the segments are moved radially inwardly and outwardly as will be explained.

The pins 50 extend between opposed substantially radial edges 55 of the segments 53 so that when the cage 47 rotates, the brake shoe segments are carried around by the pins 50. Rotation of the cage 47, together with rotation of the segments 53, causes the latter to be moved or displaced radially outwardly by centrifugal force according to the speed of rotation of the cage assembly. As the segments are moved radially outwardly by centrifugal force, their outer circular edges rub against the inner wall 56 of the fixed element 38, thereby retarding rotation of the segments and hence the pins 50, and consequently the whole cage assembly 47 for producing the desired braking action.

Driving connections I are provided for transmitting driving effort from the spring motor G to the rotary cage assembly 47, or, otherwise stated, for enabling the braking of the cage assembly 47 to retard operation of the spring motor. In the form shown, the driving connections include a floating gear 57 loosely mounted on the ribbon spool shaft 29. The floating gear 57 carries adjacent its rear side a toothed ratchet wheel 58 fast with the gear 57. A cylindrical drum 59 is keyed to the shaft 29 by means of a set screw 60, and pivoted within the drum 59 on a pivot pin 61 is a pawl 62, the nose of which is adapted to be received in a tooth interspace on the toothed wheel 58 and to cause rotation of the shaft 29 concomitantly with rotation of the gear 57 and toothed wheel 58 when the gear 57 is caused to rotate in the clockwise direction as viewed in Figures 2 and 3. The floating gear 57 is maintained in position on the shaft 29 by the drum 59 and by an enlaged diameter part 63 of the shaft 29, the part 63 having one end bearing against the front face of the gear 57, the other end of the part 63 being secured to a coupling element 64 fixed on an extension shaft 64ª.

The front plate 15 of the mounting bracket 7 is apertured adjacent its left-hand lower edge and is provided with an extended bushing 65 which journals the shaft 29. At the rear end of the shaft 29 is a pinion 66 made fast with the shaft 29 by a set screw 67, the pinion 66 meshing with a gear 68 mounted on the cage assembly hub 51. The hub 51 has an intermediate portion 69 thereof reduced in diameter so as to form a shoulder 70 which faces forwardly of the machine. The gear 68 is maintained on the reduced portion 69 and bears against the shoulder 70 which, while being quite close to the flange 45 of the bearing 44, is located sufficiently far forwardly of the bearing flange 45 to permit the gear 68 to rotate relatively to the flange 45 without interference. The end 71 of the hub 51 is reduced in diameter and is threaded for reception of a gear retaining nut 72 which is adapted to be threaded onto the end 71 tightly against the front face of the gear 68 so as to cause a binding action between the gear 68 and the shoulder 70 whereby rotation of the gear 68 causes rotation of the hub 51 and consequently rotation of the cage assembly 47.

In operation, when the typewriter or like machine carriage B is conditioned to perform a tabulating run by actuation of suitable means such as a tabulating key (not shown), the carriage is caused to move in tabulating direction under the urge of the spring motor G. In the embodiment of the invention illustrated in the drawings, the spring motor drum 11 turns in a counterclockwise direction as indicated by the arrow a, Figure 3, to drive the carriage in tabulating direction. Counterclockwise rotation of the motor drum 11 causes clockwise rotation of the floating gear 57. The ratchet pawl 62 is urged by a spring 73 to cause the nose of the pawl 62 to enter a tooth interspaced on the toothed wheel 58 which is fast with the gear 57 and consequently rotates with the latter. With the nose of the pawl 62 in engagement with the ratchet wheel 58 there is a positive coupling between the drum 59 and the gear 57 which causes the drum to rotate with the gear 57. Since the drum 59 is keyed to the shaft 29 by the set screw 60, the shaft 29 and pinion 66 are rotated clockwise in the direction indicated by the arrow b in Figure 3. Clockwise rotation of pinion 66 causes counterclockwise rotation of gear 68 as viewed in Figure 2 which causes counterclockwise rotation of the rotary cage assembly 47, including the co-planar pairs of segmental brake shoes 53. As the cage assembly 47 is rotated the brake shoe segments 53 tend to move bodily radially outwardly under centrifugal force into braking engagement with the inner wall 56 of the fixed brake drum 38 for producing a braking action between the brake shoe segments and the fixed brake drum 38. The braking action thus produced is transmitted back through the gear 68, the pinion 66, the shaft 29, the ratchet devices 59, 62, 58, and the gears 57 and 27 to retard rotation of the spring drum 11 and hence to retard driving of the carriage during the tabulating movement.

A typewriter or like machine normally will have the loading on the spring of the carriage driving motor initially set to produce carriage travel during letter spacing or during a tabulating run at a predetermined speed. In some instances it may be desirable to cause the carriage to move faster than the predetermined speed and in other instances it may be desired to decrease the carriage speed. In either of these situations, the loading on the spring 14 may be varied by the worm adjusting screw 33 as previously described to drive the carriage at the desired rate of speed. Following an adjustment of the carriage driving mechanism it may be desirable to vary the braking effort applied to the carriage by the centrifugal tabulator braking mechanism H so that the carriage will be driven at a speed most suited to the type of work being performed or most suited to the individual operator's preference.

Centrifugal tabulator brake adjusting or regulating means J are provided for controlling the amount of braking effort applied to the carriage B during a tabulating run. As shown, a threaded shaft 74 is adapted to be received within the rotary cage hub 51 which is interiorly threaded as at 75 to cooperate with the threads on the shaft 74. The shaft 74 carries an adjusting device for conditioning the rotary, sector-shaped brake shoes for operative braking engagement with the fixed brake drum. In the form of the invention disclosed in the drawings, the adjusting device includes a plate 76 held against the head 77 on the shaft 74 by a snap ring 78 removably received in a groove 79 formed in the spindle of the shaft 74 adjacent the head 77. The adjusting plate 76 carries on each side of the shaft 74 a part or projection 80 which extends forwardly of the machine and which is adapted to project into the rotary cage 47. To enable the parts 80 to project into the cage, the end plate 49 of the rotary cage 47 is provided with a pair of apertures 81 so located as to receive the parts 80. Each of the brake shoe segments 53 is provided with an aperture 82 through which one of the projections 80 is adapted to extend and hold the brake shoe segments against radial displacement when the rotary cage assembly is rotated. The projections 80 are of such length that each may extend through all of the brake shoe segments on one side of the pins 50. To permit the projections to enter the apertures 82 easily, the ends of the projections are chamfered or beveled as at 83.

To control the braking effort applied to the carriage B during a tabulating run, the centrifugal tabulator brake mechanism J is adjusted to bring all or only selected pairs of the co-planar pairs of brake segments 53 into operative condition. The adjustment is accomplished by moving the adjusting plate 76 and the parts 80 axially with respect to the cage 47 so as to cause the parts 80 to extend through the apertures of all of the brake shoe segments 53, thereby disabling the brake mechanism, or through only selected pairs of brake shoe segments, thereby enabling those selected pairs for producing a braking force. Rotation of the shaft 74 in one direction will cause the adjusting plate parts 80 to extend into the cage assembly, and rotation of the shaft 74 in the opposite direction will retract or withdraw the adjusting plate parts from engagement with selected pairs of brake shoe segments or, if desired, from engagement with all of the brake shoe segments. If the parts 80 are adjusted to extend through all of the brake shoe segments 53, none of the segments can be moved outwardly by centrifugal force which means that none of the segments can engage the inner wall 56 of the fixed brake drum and no braking motion or effort can be produced. Figure 4 discloses the adjusting mechanism J in totally disabled condition where none of the braking shoe segments can be moved outwardly against the fixed brake drum. If the adjusting plate 76 and its parts 80 are withdrawn from the apertures 82 of selected brake shoe segments 53 the selected segments are rendered free to move outwardly under centrifugal force into braking engagement with the fixed brake drum and produce braking effort on the carriage B. The amount of braking effort produced depends upon the number of pairs of brake shoe segments which are released by the adjusting projections 80. Figure 7 discloses the adjusting mechanism J withdrawn sufficiently far from the rotary cage 47 to release two pairs of brake shoe segments 53. In this arrangement one half of the total braking effort available may be produced to control the speed of the carriage B. The adjusting mechanism J may be set so as to release as many pairs of brake shoe segments as may be desired and thus produce the desired amount of braking effort.

Turning of the shaft 74 of the adjusting mechanism J is facilitated by provision of a hexagonal part 84 threaded on the end of the shaft 74 and secured in place by a pin 84'. The shaft 74 may be secured in adjusted position with respect to the hub 51 by a lock nut 85 threaded on the shaft 74. To effect an adjustment, the lock nut 85 is backed off and the hexagonal part 84 is turned, thus turning the shaft 74 of the adjusting means J. After the adjustment has been made, the parts are locked in adjusted positions by turning the lock nut 85 to cause it to bear against the end 71 of the hub 51.

The mechanism disclosed embodies the invention in its preferred form but it is intended that the disclosure be illustrative rather than definitive of the invention, the invention being defined in the appended claims.

I claim:

1. A typewriter or like machine comprising a frame part; a carriage part mounted on said frame part for tabulating and return travel; means for driving said carriage part in tabulating direction to perform a tabulating run; brake means mounted on one of said parts operable in response to the speed of tabulating travel of said carriage part for controlling the speed of said carriage part during its tabulating run, said brake means including a brake drum, a plurality of assembled brake shoes and means maintaining said brake shoes in assembled relation; and brake adjusting means for regulating the braking effort applied to said carriage by said brake means, said adjusting means including mechanism for enabling a selected number of said brake shoes while assembled with respect to said brake drum and disabling the remainder of said brake shoes while nevertheless still assembled.

2. A typewriter or like machine comprising a frame part; a carriage part mounted on said frame part for tabulating and return travel; means for driving said carriage part in tabulating direction to perform a tabulating run; centrifugal brake means mounted on one of said parts operable in response to the speed of tabulating travel of said carriage part for controlling the speed of said carriage part during its tabulating run, said brake means including a fixed brake drum, a plurality of assembled rotatable brake shoes bodily radially displaceable into engagement with said brake drum when said brake shoes are rotated and means maintaining said brake shoes in assembled relation; and brake adjusting means for regulating the braking effort applied to said carriage by said brake means, said adjusting means including mechanism for enabling a selected number of said brake shoes while assembled with respect to said brake drum and disabling the remainder of said brake shoes while nevertheless still assembled.

3. A typewriter or like machine comprising a frame part; a carriage part mounted on said frame part for tabulating and return travel; means for driving said carriage part in tabulating direction to perform a tabulating run; centrifugal brake means mounted on one of said parts, said brake means including a fixed brake drum, a plurality of assembled rotatable brake shoes bodily radially displaceable into engagement with said brake drum when said brake shoes are rotated and means maintaining said brake shoes in assembled relation; a drive transmitting connection between said carriage part driving means and said brake means for driving said rotatable brake shoes, whereby said brake means is operable in response to the speed of tabulating travel of said carriage part for controlling the speed of said carriage part during its tabulating run; and brake adjusting means for regulating the braking effort applied to said carriage part by said brake means, said adjusting means including mechanism for enabling a selected number of said brake shoes while assembled with respect to said brake drum and disabling the remainder of said brake shoes while nevertheless still assembled.

4. A typewriter or like machine comprising a frame part; a carriage part mounted on said frame part for tabulating and return travel; means for driving said carriage part in its tabulating direction; brake means mounted on one of said parts for controlling the speed of said carriage part during a tabulating run, said brake means including a fixed element and a rotatable element; driving connections between said driving means and said rotatable element for rotating the latter concurrently with driving of said carriage part, said rotatable element including a plurality of assembled brake shoes displaceable by centrifugal force into braking engagement with said fixed part and means maintaining said brake shoes in assembled relation; and brake adjusting means for controlling the braking effort applied to said carriage part, said adjusting means including a device for conditioning a selected number of said brake shoes while assembled for operative engagement with said fixed part and restraining the remainder of said brake shoes while nevertheless still assembled from engagement with said fixed part.

5. Mechanism for controlling the speed of a typewriter or like machine carriage during a tabulating run comprising a fixed element; a rotary element journalled for rotation in said fixed element and including a plurality of assembled brake shoes adapted to be displaced into braking engagement with said fixed element by centrifugal force when said rotary element is rotated and means maintaining said brake shoes in assembled relation; adjusting means for regulating the braking effort of said brake shoes and including a device for conditioning a selected number of said brake shoes while assembled for operative braking engagement with said fixed element and restraining the remainder of said brake shoes while nevertheless still assembled from engagement with said fixed element; and means on said rotary element adapted to be rotated to cause rotation of said rotary element.

6. Mechanism for controlling the speed of a typewriter or like machine carriage during a tabulating run comprising a fixed element; a rotary element journalled for rotation in said fixed element and including a plurality of assembled co-planar pairs of brake shoes adapted to be displaced into braking engagement with said fixed element by centrifugal force when said rotary element is rotated and means maintaining said brake shoes in assembled relation; adjusting means for regulating the braking effort of said brake shoes and including a device for conditioning a selected number of pairs of said brake shoes while assembled for operative braking engagement with said fixed element and restraining the remainder of said brake shoes while nevertheless still assembled from engagement with said fixed element; and means on said rotary element adapted to be rotated to cause rotation of said rotary element.

7. Mechanism for controlling the speed of a typewriter or like machine carriage during a tabulating run comprising a fixed element; a rotary element journalled for rotation in said fixed element, said rotary element including a pair of spaced plates, means holding said plates in spaced relation and connecting said plates for conjoint rotation, and a plurality of assembled brake shoes disposed between said plates and adapted to be displaced into braking engagement with said fixed element by centrifugal force when said plates are rotated; adjusting means for regulating the braking effort of said brake shoes and including a device for conditioning a selected number of said brake shoes while assembled for operative braking engagement with said fixed element and restraining the remainder of said brake shoes while nevertheless still assembled from engagement with said fixed element; and means on said rotary element adapted to be rotated to cause rotation of said rotary element.

8. Mechanism for controlling the speed of a typewriter or like machine carriage during a tabulating run comprising a fixed element; a rotary element journalled for rotation in said fixed element, said rotary element including a pair of spaced plates, means holding said plates in spaced relation and connecting said plates for conjoint rotation, and a plurality of assembled co-planar pairs of brake shoes disposed between said plates and adapted to be displaced into braking engagement with said fixed element by centrifugal force when said plates are rotated; adjusting means for regulating the braking effort of said brake shoes and including a device for conditioning a selected number of said pairs of brake shoes while assembled for operative braking engagement with said fixed element and restraining the remainder of said brake shoes while nevertheless still assembled from engagement with said fixed element; and means on said rotary element adapted to be rotated to cause rotation of said rotary element.

9. Mechanism for controlling the speed of a typewriter or like machine carriage during a tabulating run comprising a fixed element; a rotary element journalled for rotation in said fixed element, said rotary element including a pair of spaced plates, one of which is apertured, means holding said plates in spaced relation and connecting said plates for conjoint rotation, and a plurality of assembled apertured brake shoes disposed between said plates and adapted to be displaced into braking engagement with said fixed element by centrifugal force when said plates are rotated; adjusting means for regulating the braking effort of said brake shoes, said adjusting means including a device having a projection adapted to extend through the apertures of said one plate and said brake shoes for conditioning a selected number of said brake shoes while assembled for operative braking engagement with said fixed element and restraining the remainder of said brake shoes while nevertheless still assembled from engagement with said fixed element; and means on said rotary element adapted to be rotated to cause rotation of said rotary element.

10. Mechanism for controlling the speed of a typewriter or like machine carriage during a tabulating run comprising a fixed element; a rotary element journalled for rotation in said fixed element, said rotary element including a pair of spaced plates, one of which is apertured, means holding said plates in spaced relation and connecting said plates for conjoint rotation, and a plurality of assembled co-planar pairs of apertured brake shoes disposed between said plates and adapted to be displaced into braking engagement with said fixed element by centrifugal force when said plates are rotated; adjusting means for regulating the braking effort of said brake shoes, said adjusting means including a device having a projection adapted to extend through the apertures of said one plate and said brake shoes for conditioning a selected number of said pairs of brake shoes while assembled for operative braking engagement with said fixed element and restraining the remainder of said brake shoes while nevertheless still assembled from engagement with said fixed element; and means on said rotary element adapted to be rotated to cause rotation of said rotary element.

11. Mechanism for controlling the speed of a typewriter or like machine carriage during a tabulating run comprising a cylindrical brake drum; a rotary cage assembly journalled for rotation in said brake drum; at least one pair of brake shoes carried by said cage assembly and adapted to be displaced radially into engagement with said brake drum when said cage assembly is rotated; brake shoe enabling and disabling means extending into said cage assembly and having a part engageable with each shoe of said pair of brake shoes to prevent radial displacement of said pair of shoes when said enabling and disabling means is in brake shoe disabling position; means for adjusting said enabling and disabling means to selected positions in which said enabling and disabling means is engaged or unengaged with said pair of brake shoes; and means for locking said adjusting means in selected position.

12. Mechanism for controlling the speed of a typewriter or like machine carriage during a tabulating run comprising a cylindrical brake drum; a rotary cage assembly journalled for rotation in said brake drum; said cage assembly including a pair of spaced plates, one of which is apertured; at least one pair of apertured brake shoes carried by said cage assembly disposed between said plates and adapted to be displaced radially into engagement with said brake drum when said cage assembly is rotated; brake shoe enabling and disabling means extending into said cage assembly and having a part extendible through the apertures of said plate and said brake shoes so as to be engageable with each shoe of said pair of brake shoes to prevent radial displacement of said pair of shoes when said enabling and disabling means is in brake shoe disabling position; means for adjusting said enabling and disabling means to selected positions in which said enabling and disabling means is engaged or unengaged with said pair of brake shoes; and means for locking said adjusting means in selected position.

13. Mechanism for controlling the speed of a typewriter or like machine carriage during a tabulating run comprising a fixed cylindrical brake drum; a rotary cage assembly having a hub journalled for rotation in said brake drum, said hub having a portion of its interior screw threaded; at least one pair of brake shoes carried by said cage assembly and adapted to be displaced radially into engagement with said brake drum when said cage assembly is rotated; brake shoe enabling and disabling means extending into said cage assembly and having a part movable from a normal or brake shoe enabling position free from engagement with said brake shoes to a brake shoe disabling position in which said part is engageable with each shoe of said pair of brake shoes to prevent radial displacement of said pair of shoes when said enabling and disabling means is in brake shoe disabling position; and adjusting means for moving said enabling and disabling means selectively to its brake shoe enabling and disabling positions, said adjusting means including a screw received in said screw threaded hub and carrying said part.

14. Mechanism for controlling the speed of a typewriter or like machine carriage during a tabulating run comprising a fixed cylindrical brake drum; a rotary cage assembly having a hub journalled for rotation in said brake drum, said hub having a portion of its interior screw threaded; at least one pair of brake shoes carried by said cage assembly and adapted to be displaced radially into engagement with said brake drum when said cage assembly is rotated; brake shoe enabling and disabling means extending into said cage assembly and having a part movable from a normal or brake shoe enabling position free from engagement with said brake shoes to a brake shoe disabling position in which said part is engageable with each shoe of said pair of brake shoes to prevent radial displacement of said pair of shoes; adjusting means for moving said enabling and disabling means selectively to its brake shoe enabling and disabling positions, said adjusting means including a screw received in said screw threaded hub and carrying said part; and means for locking said adjusting means in selected position.

15. Mechanism for controlling the speed of a typewriter or like machine carriage during a tabulating run comprising a fixed cylindrical brake drum; a rotary cage assembly having a hub journalled for rotation in said brake drum, said hub having a portion of its interior screw threaded; a plurality of assembled co-planar pairs of brake shoes carried by said cage assembly and adapted to be displaced radially into engagement with said brake drum when said cage assembly is rotated; brake shoe enabling and disabling means extending into said cage assembly and having a part movable from a normal or brake shoe enabling position free from engagement with said brake shoes to a brake shoe disabling position in which said part is engageable with selected pairs of brake shoes to prevent radial displacement of said selected pairs of brake shoes; and adjusting means for moving said enabling and disabling means selectively to its brake shoe enabling and disabling positions while said brake shoes are assembled, said adjusting means including a screw received in said screw threaded hub and carrying said part.

16. Mechanism for controlling the speed of a typewriter or like machine carriage during a tabulating run comprising a fixed cylindrical brake drum; a rotary cage assembly having a hub journalled for rotation in said brake drum, said hub having a portion of its interior screw threaded; a plurality of assembled co-planar pairs of brake shoes carried by said cage assembly and adapted to be displaced radially into engagement with said brake drum when said cage assembly is rotated; brake shoe enabling and disabling means extending into said cage assembly and having a part movable from a normal or brake shoe enabling position free from engagement with said brake shoes to a brake shoe disabling position in which said part is engageable with selected pairs of brake shoes to prevent radial displacement of said selected pairs of brake shoes; adjusting means for moving said enabling and disabling means selectively to its brake shoe enabling and disabling positions while said brake shoes are assembled; said adjusted means including a screw received in said screw threaded hub and carrying said part; and means for locking said adjusting means in selected position.

17. Mechanism for controlling the speed of a typewriter or like machine carriage during a tabulating run comprising a fixed cylindrical brake drum; a rotary cage assembly journalled for rotation in said brake drum; said cage assembly including a pair of spaced plates, pins connecting said plates for conjoint rotation and holding said plates in spaced relation, and a plurality of assembled pairs of sector-shaped brake shoes disposed between said plates and adapted to be displaced radially into engagement with said brake drum when said cage assembly is rotated, the brake shoes of each of said pairs of brake shoes being located respectively on opposite sides of said pins so as to be carried around by said pins when said cage assembly is rotated; brake shoe enabling and disabling means extending into said cage assembly and including a part movable from a normal or brake shoe enabling position free from engagement with said brake shoes to a brake shoe disabling position in which said part is engageable with selected pairs of brake shoes to prevent radial displacement of said selected pairs of brake shoes; and adjusting means for moving said enabling and disabling means selectively to its brake shoe enabling and disabling positions while said brake shoes are assembled.

18. Mechanism for controlling the speed of a typewriter or like machine carriage during a tabulating run comprising a fixed cylindrical brake drum; a rotary cage assembly having a hub journalled for rotation in said brake drum, said hub having a portion of its interior screw threaded; said cage assembly including a pair of spaced plates, pins connecting said plates for conjoint rotation and holding said plates in spaced relation, and a plurality of assembled pairs of sector-shaped brake shoes disposed between said plates and adapted to be displaced radially into engagement with said brake drum when said cage assembly is rotated, the brake shoes of each of said pairs of brake shoes being located respectively on opposite sides of said pins so as to be carried around by said pins when said cage assembly is rotated; brake shoe enabling and disabling means extending into said cage assembly and including a part movable from a normal or brake shoe enabling position free from engagement with said brake shoes to a brake shoe disabling position in which said part is engageable with selected pairs of brake shoes to prevent radial displacement of said selected pairs of brake shoes; and adjusting means for moving said enabling and disabling means selectively to its brake shoe enabling and disabling positions while said brake shoes are assembled, said adjusting means including a screw received in said screw threaded hub and carrying said part.

References Cited in the file of this patent
UNITED STATES PATENTS

| | | |
|---|---|---|
| 1,567,368 | Hokanson | Dec. 29, 1925 |
| 1,634,948 | Lambert | July 5, 1927 |
| 2,340,491 | Sagner | Feb. 1, 1944 |
| 2,379,843 | Von Reppert | July 3, 1945 |